US010820360B1

(12) United States Patent
Glaenzer et al.

(10) Patent No.: US 10,820,360 B1
(45) Date of Patent: Oct. 27, 2020

(54) APPLICATION-ASSISTED FRIENDLY PAIRING

(71) Applicant: SOCKET MOBILE, INC., Newark, CA (US)

(72) Inventors: Eric Florent Glaenzer, New York, NY (US); Vincent J. Coli, Mountain View, CA (US)

(73) Assignee: Socket Mobile, Inc., Newark, CA (US)

( * ) Notice: Subject to any disclaimer, the term of this patent is extended or adjusted under 35 U.S.C. 154(b) by 0 days.

(21) Appl. No.: 16/118,092

(22) Filed: Aug. 30, 2018

Related U.S. Application Data

(60) Provisional application No. 62/552,371, filed on Aug. 30, 2017.

(51) Int. Cl.
*H04W 4/00* (2018.01)
*H04W 76/14* (2018.01)
*H04W 48/16* (2009.01)
*H04W 24/08* (2009.01)
*H04W 4/80* (2018.01)

(52) U.S. Cl.
CPC .............. *H04W 76/14* (2018.02); *H04W 4/80* (2018.02); *H04W 24/08* (2013.01); *H04W 48/16* (2013.01)

(58) Field of Classification Search
CPC ...... H04W 76/14; H04W 24/08; H04W 48/16; H04W 4/80
USPC ......................................... 370/329, 330, 331
See application file for complete search history.

(56) References Cited

U.S. PATENT DOCUMENTS

| 2016/0088424 | A1* | 3/2016 | Polo | H04W 4/80 455/41.1 |
| 2017/0094445 | A1* | 3/2017 | Shanmugam | H04L 41/0806 |
| 2019/0150215 | A1* | 5/2019 | Li | H04B 7/24 370/329 |
| 2019/0253857 | A1* | 8/2019 | Li | H04W 52/0209 |

* cited by examiner

*Primary Examiner* — Chuong T Ho
(74) *Attorney, Agent, or Firm* — PatentVentures; Bennett Smith; Korbin Van Dyke

(57) ABSTRACT

Application-assisted friendly pairing provides a classic-energy radio technology user interface experience to a user operating a peripheral device in conjunction with a central device. The classic-energy radio technology user interface experience is provided while using a low-energy radio technology for communication between the peripheral device and the central device. The user interface experience is enabled via installation and execution of an application on the central device.

24 Claims, 5 Drawing Sheets

APPLICATION-ASSISTED FRIENDLY PAIRING

CROSS REFERENCE TO RELATED APPLICATIONS

To the extent permitted by the type of the instant application, this application incorporates by reference for all purposes the following applications, all commonly owned with the instant application not later than the effective filing date of the instant application:

U.S. Provisional Application Ser. No. 62/552,371, filed Aug. 30, 2017, first named inventor Eric Florent GLAENZER, and entitled APPLICATION-ASSISTED FRIENDLY PAIRING.

BACKGROUND

Field

Advancements in peripheral device and central device interoperation user experience are needed to provide improvements in cost, profitability, performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Improvements to peripheral device and central device interoperation user experience are needed to ease transition from classic-energy radio technology to low-energy radio technology. Examples of a central device are a smartphone, a tablet computer, a laptop computer, and any other type of device usable in conjunction with a peripheral device. Examples of peripheral devices are a Near Field Communication (NFC) tag reader and/or writer, a Radio Frequency IDentification (RFID) reader and/or writer, a barcode (e.g. optical barcode) scanner, and any other type of device usable in conjunction with a central device. An example of classic-energy radio technology is 'classic' Bluetooth (e.g. Bluetooth version 2.1). An example of low-energy radio technology is Bluetooth Low Energy (AKA Bluetooth LE, AKA BLE, e.g. Bluetooth version 4.2).

Under classic Bluetooth a peripheral that has previously been used with a central host is able to quickly and automatically reestablish a working link when the peripheral attempts to reconnect with the (ready and in range) central host, and without requiring any user direction to the central host. In contrast, under BLE the central has control over whether or not a working link is reestablished and the user must provide direction to the central host to reestablish a working link for a previously used peripheral. In this regard, the new BLE behavior has power management benefits, particularly in environments with many peripherals. However, users familiar with classic Bluetooth peripherals may be confused, delayed, interrupted, or otherwise inconvenienced by the different link reestablishment behavior when using BLE peripherals. The user may believe that the BLE peripheral is malfunctioning. Unwarranted returns or IT customer support calls may result. The user's efficiency and productivity may decline compared to use of classic Bluetooth peripherals.

Synopsis

The invention may be implemented in numerous ways, e.g. as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

Application-assisted friendly pairing provides a classic-energy radio technology user interface experience to a user operating a peripheral device in conjunction with a central device. The classic-energy radio technology user interface experience is provided while using a low-energy radio technology for communication between the peripheral device and the central device. The user interface experience is enabled via installation and execution of an application for friendly pairing (AKA friendly-pairing application) on the central device that hides from the user the different link reestablishment behavior of BLE peripherals, compared to classic Bluetooth peripherals. The friendly-pairing application enables a BLE peripheral that has previously been used with a central host to quickly and automatically reestablish a working link with the central host when both devices are next ready and in range of each other, and without manual user direction to the central host. By effectively emulating the classic Bluetooth link reestablishment behavior while using BLE, the friendly-pairing application effectively cedes control of BLE link reestablishment to the peripheral and in so doing mitigates user confusion, delays, interruptions, and other inconveniences, while providing compatible operation with both BLE and classic Bluetooth peripherals. The BLE peripheral interaction with the central host is as expected by the user familiar with classic Bluetooth peripherals. Unwarranted returns and IT customer support calls are thus avoided. A central and peripheral system compatible with both classic and BLE Bluetooth radio systems that uses the application-assisted friendly pairing thus works better and has improved process and operation over a system without application-assisted friendly pairing.

DETAILED DESCRIPTION

Figure 1:
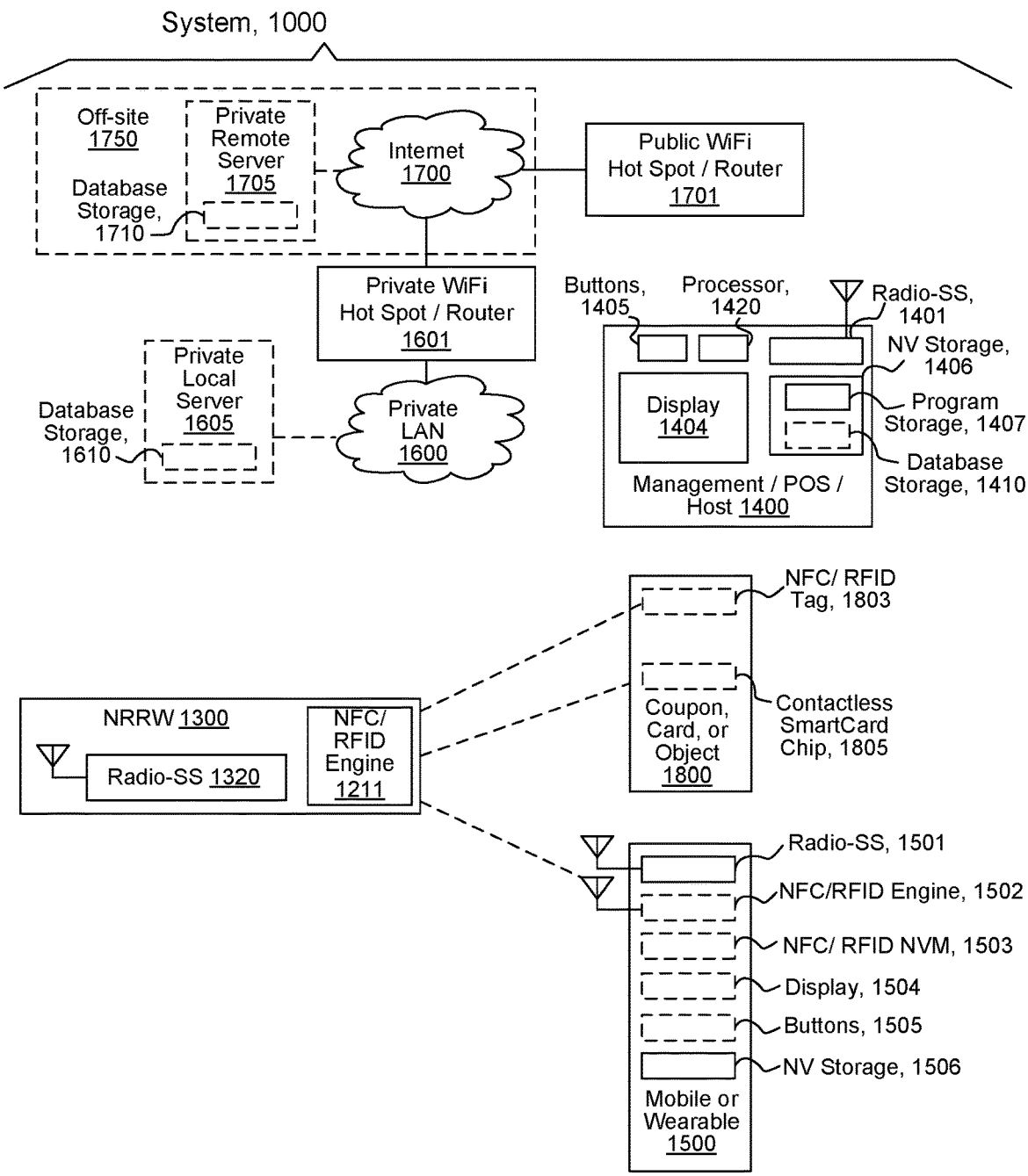
FIG. 1 illustrates, via a structural perspective, embodiments for application-assisted friendly pairing.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method comprising:
in a central device comprising a low-energy radio and via operation in a central role, monitoring low-energy radio advertising data;
in one or more instances of a particular type of peripheral device, each instance comprising a respective low-energy radio and via operation in a peripheral role, providing respective low-energy radio peripheral advertising data, the monitored low-energy radio advertising data comprising at least a portion of the respective low-energy radio peripheral advertising data;
in the central device, determining from the monitored low-energy radio advertising data respective identities of ones of the instances within radio range of the central device;
selecting a favorite subset of the instances within radio range and recording the identities of the favorite subset; and
in the central device and in response to the monitored low-energy radio advertising data corresponding to one or more of the recorded identities, establishing one or more respective connections between the central device and respectively the one or more instances corresponding to the corresponding one or more of the recorded identities.

EC2) The method of EC1, wherein the monitoring is intermittent.

EC3) The method of EC2, wherein the intermittent monitoring is periodic monitoring.

EC4) The method of EC1, wherein the low-energy radios are compatible with one or more versions of Bluetooth Low Energy radios.

EC5) The method of EC1, wherein the selecting is at least in part via input from a user interface of the central device.

EC6) The method of EC1, further comprising providing information in accordance with the identities via a user interface of the central device.

EC7) The method of EC1, wherein the central device is any one or more of a phone, a tablet, a laptop computer, and a portable computing device.

EC8) The method of EC1, wherein the particular type is any one or more of a particular type of NFC reader, a particular type of NFC reader/writer, a particular type of RFID reader, a particular type of RFID reader/writer, and a particular type of barcode scanner.

EC9) The method of EC1, further comprising exchanging data between the central device and at least one of the instances via at least one of the connections.

EC10) The method of EC1, wherein the monitored low-energy radio advertising data further comprises low-energy radio advertising data from one or more instances of another particular type of peripheral device distinct from the particular type of peripheral device.

EC11) The method of EC1, wherein the monitoring is under control of an application installed on the central device.

EC12) The method of EC11, further comprising the application ceasing the monitoring after the establishing.

EC13) A method comprising:
establishing a list of favorite peripheral devices associated with a central device, each favorite peripheral device comprising a respective low-energy radio enabling communication with the central device at least via operation in a peripheral role and the central device comprising a low-energy radio enabling communication with any of the favorite peripheral devices at least via operation in a central role;

in the central device, monitoring for low-energy radio advertising data of the favorite peripheral devices; and in the central device and in response to the low-energy radio advertising data corresponding to a particular one of the favorite peripheral devices, establishing a connection between the central device and the particular favorite device.

EC14) A system for providing a consistent peripheral-to-host-connection user experience across classic Bluetooth and BLE Bluetooth peripherals, the system comprising:

a computing host comprising a memory and a hardware processor configured to perform a predefined set of basic operations in response to receiving a corresponding basic instruction selected from a predefined native instruction set of codes;

a dual-mode classic/BLE Bluetooth radio subsystem of the computing host, wherein previously connected peripherals operating in accordance with a classic Bluetooth mode are upon an attempt to reconnect automatically reconnected by the radio subsystem without requiring any subsequent action by a user/agent, and wherein previously connected peripherals operating in accordance with a Bluetooth BLE mode require subsequent action by a user/agent to reconnect upon a reconnection attempt; and a BLE friendly pairing subsystem of the computing host comprising a first set of machine codes selected from the native instruction set for, responsive to user operated control of the computing host, updating storage in the memory identifying select peripherals as favorites, a second set of machine codes selected from the native instruction set for monitoring for BLE favorites attempting to reconnect, a third set of machine codes selected from the native instruction set for acting as the user/agent to enable prompt reconnection of all the BLE favorites attempting to reconnect; and wherein each of the sets of machine codes is stored in the memory.

EC15) The system for providing a consistent peripheral-to-host-connection user experience across classic Bluetooth and BLE Bluetooth peripherals of EC14, wherein the BLE friendly pairing subsystem of the computing host further comprises a fourth set of machine codes selected from the native instruction set for, additionally responsive to the user operated control of the computing host, connecting to all available peripherals attempting to connect, wherein the subsequently connected peripherals are included among the peripherals identified as favorites; and wherein the fourth set of machine codes is stored in the memory.

EC16) The system for providing a consistent peripheral-to-host-connection user experience across classic Bluetooth and BLE Bluetooth peripherals of EC15, wherein the BLE friendly pairing subsystem of the computing host further comprises a fifth set of machine codes selected from the native instruction set for, subsequent to the connecting to all available peripherals attempting to connect, pairing with all connected peripherals operating in accordance with the classic Bluetooth mode, and pairing and bonding with all connected peripherals operating in accordance with the Bluetooth BLE mode; and wherein the fifth set of machine codes is stored in the memory.

EC17) The system for providing a consistent peripheral-to-host-connection user experience across classic Bluetooth and BLE Bluetooth peripherals of EC14, wherein the BLE friendly pairing subsystem of the computing host further comprises a sixth set of machine codes selected from the native instruction set for implementing the user operated control as a virtualized control on a touch-screen of the computing host; and wherein the sixth set of machine codes is stored in the memory.

EC18) The system for providing a consistent peripheral-to-host-connection user experience across classic Bluetooth and BLE Bluetooth peripherals of EC17, wherein the virtualized control is a slide switch.

EC19) The system for providing a consistent peripheral-to-host-connection user experience across classic Bluetooth and BLE Bluetooth peripherals of EC17, wherein the virtualized control is a button.

EC20) The system for providing a consistent peripheral-to-host-connection user experience across classic Bluetooth and BLE Bluetooth peripherals of EC14, wherein the user operated control is a physical switch.

EC21) The system for providing a consistent peripheral-to-host-connection user experience across classic Bluetooth and BLE Bluetooth peripherals of EC14, wherein the computing host is a device selected from a phone, a tablet, a laptop computer, and a portable computing device.

EC22) The system for providing a consistent peripheral-to-host-connection user experience across classic Bluetooth and BLE Bluetooth peripherals of EC14, wherein at least one of the previously connected peripherals is a device selected from an NFC reader, a particular type of NFC reader/writer, a particular type of RFID reader, a particular type of RFID reader/writer, and a particular type of barcode scanner.

EC23) The system for providing a consistent peripheral-to-host-connection user experience across classic Bluetooth and BLE Bluetooth peripherals of EC14, wherein the automatically reconnected peripherals operating in accordance with the classic Bluetooth mode are previously connected and paired peripherals.

EC24) The system for providing a consistent peripheral-to-host-connection user experience across classic Bluetooth and BLE Bluetooth peripherals of EC14, wherein the BLE favorites are previously connected, paired, and bonded peripherals operating in accordance with the Bluetooth BLE mode.

System

FIG. 1 illustrates, via a structural perspective, embodiments for application-assisted friendly pairing, as System 1000. In some embodiments, a system comprises NRRW 1300, Management/Point-Of-Sale Tablet 1400 (or equivalent host), and Customer devices, such as a Mobile or Wearable device 1500, and/or Coupon, Card, or Object 1800. In various embodiments, Management/Point-Of-Sale Tablet 1400 is intended to represent a central device associated with application-assisted friendly pairing, with NRRW 1300 representing a peripheral device of the application-assisted friendly pairing.

In some embodiments, NRRW 1300 is an NFC/RFID tag cordless hand scanner, optimized to operatively scan NFC and/or RFID targets while being wielded by one hand, and comprises NFC/RFID-Engine 1211 enabled to read and/or write NFC and/or RFID tags. In some embodiments, Radio Subsystem 1320 comprises any one or more of a (Classic) Bluetooth Radio, a low-energy Bluetooth radio (BLE), and a dual-mode Classic/BLE Bluetooth radio enabled to communicate with Management/Point-Of-Sale Tablet 1400 for receiving configuration commands and for communication of, and status about, decoded NFC and/or RFID targets and various other types of targets. In some embodiments, NRRW 1300 is integral to a terminal stand and is not removable. In some embodiments, NRRW 1300 is a cordless hand scanner, optimized to operatively scan optical targets while being wielded by one hand, and comprises an optical scan engine, enabled to read optical bar codes of various types. In various embodiments, NRRW 1300 is selectively operable as an NFC/RFID tag cordless hand scanner and/or a cordless hand scanner.

Management/Point-Of-Sale Tablet 1400 comprises Processor 1420, Radio Subsystem 1401, Buttons 1405, Display 1404, Nonvolatile storage 1406, Program Storage 1407, and according to embodiment Database Storage 1410. In some embodiments, Management/Point-Of-Sale Tablet 1400 is an Apple iPad running inter alia a Point-Of-Sale (POS) application on top of an Apple IOS operating system. In some embodiments, Management/Point-Of-Sale Tablet 1400 is an Android-compatible device (such as a tablet) running inter alia a Point-Of-Sale (POS) application on top of an Android operating system. In some embodiments, Management/Point-Of-Sale Tablet 1400 is a Windows-compatible device (such as a tablet) running inter alia a Point-Of-Sale (POS) application on top of a Windows operating system. In some embodiments, Radio Subsystem 1401 comprises a WiFi radio and a dual-mode Classic/BLE Bluetooth radio. In various embodiments, any one or more of Classic and BLE modes are used for communications with NRRW 1300. In some embodiments, the WiFi radio is to communicate via Private WiFi Hot Spot/Router 1601 and Private LAN 1600 with Private Local Server 1605 to access Database Storage 1610. In some embodiments having one or more elements of Off-site 1750, Tablet 1400 optionally also communicates via Internet 1700 with Private Remote Server 1705 to access Database Storage 1710. The various Database Storage instances 1410, 1610, and 1710, are optionally used according to embodiment for one or more of syncing, backup, or caching of database subsets, in accordance with well-known methods.

Mobile or Wearable 1500 is intended to represent one of either a mobile device (such as a smartphone, or tablet, generally having a display) or a wearable device (such as a watch or fitness band, having a small or no display according to embodiment). According to embodiment, Mobile or Wearable 1500 comprises one or more of Radio Subsystem 1501, NFC Engine 1502, NFC Non-volatile Memory (NFC NVM) 1503, Display 1504, Buttons 1505, and NV Storage 1506. In some embodiments, Mobile or Wearable 1500 is a selected one of an IOS smartphone, an Android smartphone, a Windows smartphone, a BlackBerry smartphone, an Apple Watch, a Sony Smartwatch, or an NFC smart wristband, ring, bracelet, necklace, or other jewelry. According to embodiment, Radio Subsystem 1501 is enabled to receive Beacon information (such as from a BLE radio of another agent of FIG. 1) via, e.g., an included Bluetooth/BLE capability. According to embodiment, mobile devices optionally and/or selectively connect to Internet 1700 either via an integral cellular connection or via Public WiFi Hot Spot/Router 1701. Access to the Public Hot Spot is variously unrestricted, provided as a general customer courtesy, or selectively provided as part of a customer loyalty program (for example, to those Customers who have installed a customer loyalty application, or have met other predetermined customer loyalty criteria), according to embodiment and/or usage scenario.

In various embodiments, Coupon, Card, or Object 1800 is intended to represent one of either an e.g., credit-card sized electronic identity card (such as used for access, transit, and banking) or a printed-paper coupon. According to embodiment, Coupon, Card, or Object 1800 comprises one or more of NFC Tag 1803 or Contactless SmartCard Chip 1805. In some embodiments, Coupon, Card, or Object 1800 is a selected one of an NFC Loyalty Card, a printed coupon, a QR Code Loyalty Card, or an Oyster Card. In various embodiments, Coupon, Card, or Object 1800 is intended to represent any type of NFC tag and/or RFID tag. In various embodiments, Coupon, Card, or Object 1800 is intended to represent any type barcode, e.g., optical barcode such as linear barcode, a 2D barcode, or a QR barcode.

Figure 2:
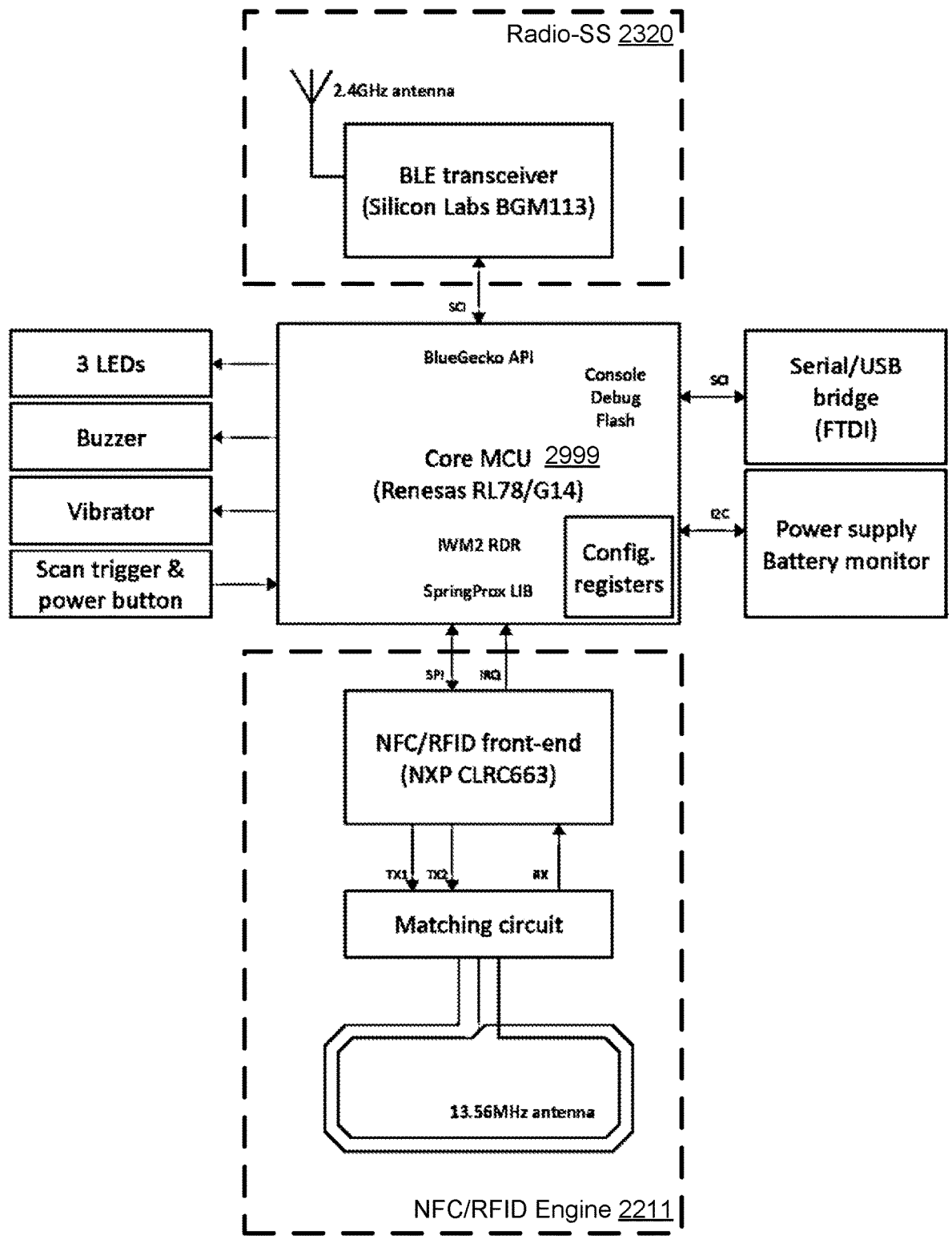
FIG. 2 illustrates, via a structural perspective, embodiments of a peripheral device comprising any combination of a Near Field Communication (NFC) tag reader and/or writer and a Radio Frequency IDentification (RFID) reader and/or writer.

FIG. 2 illustrates, via a structural perspective, embodiments of a peripheral device comprising any combination of a Near Field Communication (NFC) tag reader and/or writer and a Radio Frequency IDentification (RFID) reader and/or writer. In various embodiments and/or usage scenarios, any one or more elements and/or portions thereof of FIG. 2 correspond to any one or more elements and/or portions thereof of NRRW 1300 of FIG. 1. As a specific example, Radio-SS 2320 corresponds, in some embodiments, to all or any portions of Radio-SS 1320 of FIG. 1. As another specific example, NFC/RFID-Engine 2211 corresponds, in some embodiments, to all or any portions of NFC/RFID-Engine 1211 of FIG. 1. In some embodiments, Core MCU 2999 comprises one or more NVMs and the core is enabled to execute code stored in the NVMs.

Figure 3:
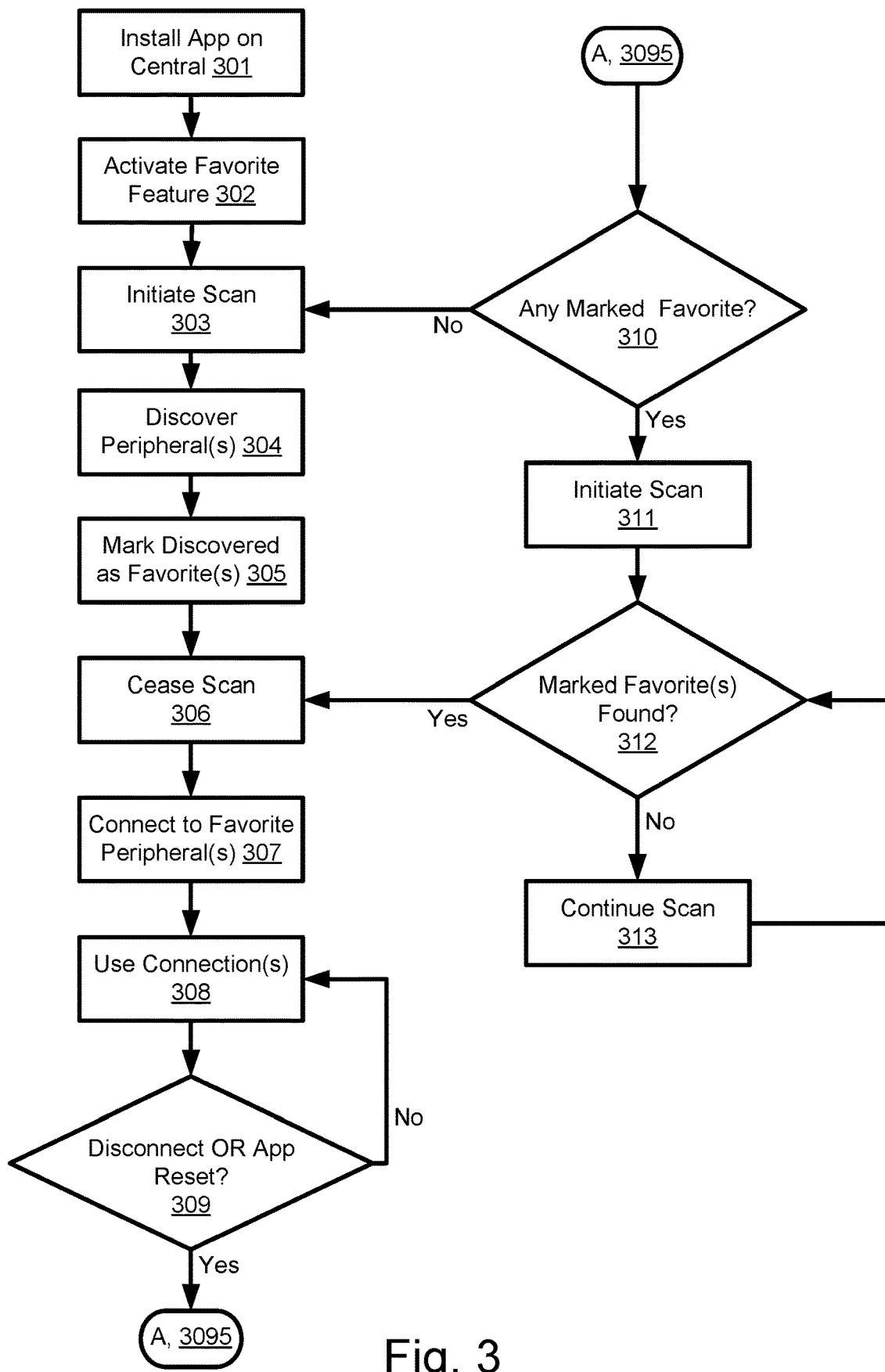
FIG. 3 illustrates, via a flow perspective, embodiments for application-assisted friendly pairing.

FIG. 3 illustrates, via a flow perspective, embodiments for application-assisted friendly pairing. The flow perspective is that of a central role device executing an application for friendly pairing. An example of an operating context for FIG. 3 is the following. Management/Point-Of-Sale Tablet 1400 of FIG. 1 is, e.g., a phone operating as a BLE central device, and Radio-SS 1401 comprises a BLE radio. NRRW 1300 of FIG. 1 is, e.g., an NFC/RFID reader/writer operating as a BLE peripheral device, and Radio-SS 1320 comprises a BLE radio. The application-assisted friendly pairing, provided by a specific application referred to herein as 'CaptureHelperUI', enables a user to identify a specific instance of NRRW 1300 to a specific instance of Management/Point-Of-Sale Tablet 1400 as a known peripheral device. Once identified, the specific instance of Management/Point-Of-Sale Tablet 1400 recognizes the specific instance of NRRW 1300 with reduced delay compared to a system without the identification that the CaptureHelperUI provides.

Referring to FIG. 3, flow beings with the user installing the CaptureHelperUI application on Management/Point-Of-Sale Tablet 1400 (action 301). With the CaptureHelperUI application running in the foreground on Management/Point-Of-Sale Tablet 1400, the user indicates to the application to activate the favorite feature by providing specific input, such as by tapping/touching a particular portion of Display 1404 and/or activating one or more of Buttons 1405 (action 302). In response, the CaptureHelperUI application directs the BLE radio of Radio-SS 1401 to perform a BLE scan (action 303). The BLE radio of Radio-SS 1320 periodically provides advertising data that Radio-SS 1401 receives when NRRW 1300 and Management/Point-Of-Sale Tablet 1400 are within BLE radio communication range of each other. In response to reception of the advertising data, Management/Point-Of-Sale Tablet 1400 recognizes NRRW 1300 as a discoverable peripheral device (action 304).

The discoverable peripheral device is then marked (tagged, or otherwise identified) as a favorite by the CaptureHelperUI application (action 305). E.g., the user directs the application to do the marking, but more generally the marking is as detailed further below. The CaptureHelperUI application maintains state identifying current and/or past favorite peripheral devices in NVM, such as Nonvolatile storage 1406. The CaptureHelperUI application directs the BLE radio of Radio-SS 1401 to cease performing the BLE scan (action 306). Then the CaptureHelperUI application directs Management/Point-Of-Sale Tablet 1400 to implement a connection with NRRW 1300 as a favorite peripheral device (action 307). In some embodiments and/or usage scenarios, implementing the connection corresponding to a BLE peripheral being added as a favorite (flows reaching action 307 via action 305) comprises a connection, one-time pairing, and bonding, while implementing the connection corresponding to a previously identified BLE favorite (flows reaching action 307 via action 312) comprises connection and bonding. The connection is used (action 308) until either there is a disconnection event (for any reason) or the CaptureHelperUI application is reset (action 309).

If there is a disconnection event or the CaptureHelperUI application is reset, then the CaptureHelperUI application determines if there is a marked favorite (action 310). If there is not a marked favorite, then flow proceeds to action 303 to perform a BLE scan to attempt to discover a peripheral device. If there is a marked favorite, then flow proceeds to attempt to find the marked favorite by the CaptureHelperUI application directing the BLE radio of Radio-SS 1401 to perform a BLE scan (action 311). The CaptureHelperUI application determines if the marked favorite is found (action 312). If the marked favorite is found, then flow proceeds to action 306 to cease performing the BLE scan. If the marked favorite is not found, then flow loops as necessary through actions 312 and 313 to continue looking for the marked favorite. In some embodiments and/or usage scenarios, action 312 exits to, e.g., an error routine after a timeout period.

A disconnection event occurs variously, for example, when Management/Point-Of-Sale Tablet 1400 and NRRW 1300 move outside of communication range, either are turned off, or the user explicitly terminates the connection.

A reset of the CaptureHelperUI application occurs variously, for example, when the CaptureHelperUI application is (re)installed, the CaptureHelperUI application while running in the background is 'swiped away' (closed, or terminated), Management/Point-Of-Sale Tablet 1400 is turned off, or the user explicitly resets the CaptureHelperUI application.

In some embodiments and/or usage scenarios, action 303 comprises a BLE scan that limits resultant advertising data to peripheral devices that are of one or more particular types. For example, only NFC reader/writer peripheral devices are directed to respond. For another example, only RFID reader/writer peripheral devices made by a particular manufacturer are directed to respond.

In some embodiments and/or usage scenarios, a BLE scan request as sent by Management/Point-Of-Sale Tablet 1400 specifies a specific SERVICEUUID, and only peripheral devices that support the specific SERVICEUUID respond with advertising data. The advertising data is sufficient to determine that the respondents are eligible to be favorite peripheral devices, e.g., are of a proper type and/or made by a proper manufacturer.

In some embodiments and/or usage scenarios, action 304 results in discovery of a plurality of BLE peripheral devices. Optionally and/or selectively, only the first one of the plurality of BLE devices that is discovered is marked as a favorite peripheral device. Optionally and/or selectively, a representation of one or more of the plurality of discovered BLE peripheral devices are presented to the user, e.g., via Display 1404. In response, the user selects all or any portion of the presented devices as favorite peripheral devices, e.g., by tapping/touching Display 1404.

The CaptureHelperUI application enables the unified management of various diverse peripherals. In some embodiments and/or usage scenarios, there are a plurality of favorite peripheral devices, and connections are implemented with all or any portion of the plurality of favorite peripheral devices as they are discovered (e.g. actions 311 and 312). In some embodiments and/or usage scenarios, the connected favorite devices comprise one or more devices selected from a) NFC reader/writers, b) RFID reader/writers, and c) barcode readers. In some embodiments and/or usage scenarios, the CaptureHelperUI application enables the display of scanned data from any of the connected device types. In some embodiments and/or usage scenarios, the CaptureHelperUI application manages the automatic reconnection of any favorite device, disconnected for any reason.

In some embodiments and/or usage scenarios, the CaptureHelperUI application implements the add to favorites function based on the state of a GUI rendered virtual switch on the central's touch screen.

In various embodiments and/or usage scenarios, the CaptureHelperUI application is executed in whole or in part by Processor 1420. In various embodiments and/or usage scenarios, the CaptureHelperUI application maintains state identifying current and/or past favorite peripheral devices in Non-Volatile Memory (NVM), such NV Storage 1406.

Figure 4:
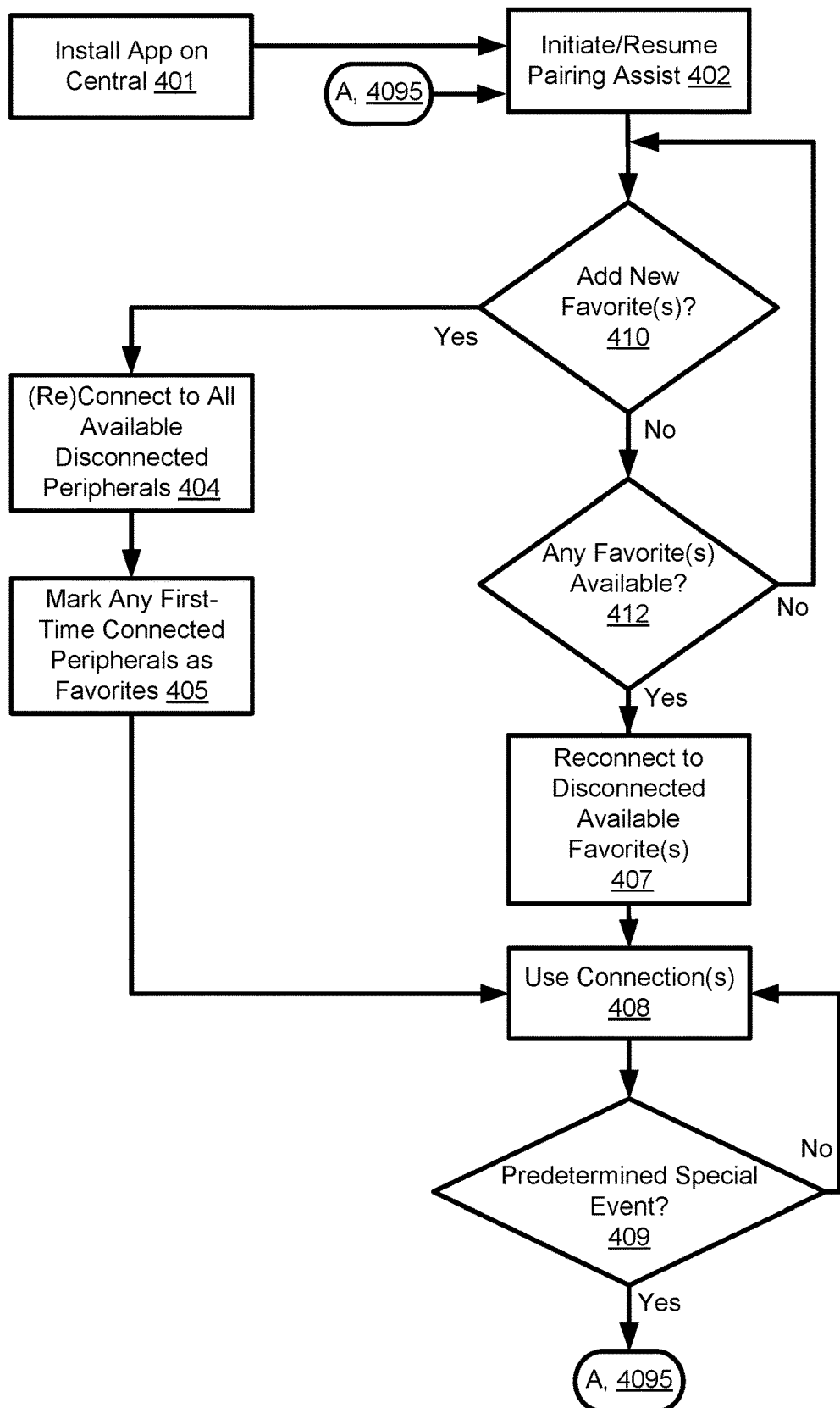
FIG. 4 illustrates, via a flow perspective, additional embodiments for application-assisted friendly pairing.

FIG. 4 illustrates, via a flow perspective, additional embodiments for application-assisted friendly pairing. The flow perspective is that of a central role device executing an application for friendly pairing. With respect to the discussion of FIG. 4, it will be understood that adding favorites means adding new peripherals to the set of peripherals marked as favorites, and otherwise the term favorites refers to marked favorites (devices previously identified as favorites). It will further be understood that available means powered on with an appropriate radio in range and ready to connect. Aspects not detailed below explicitly with respect to FIG. 4 are as otherwise described in conjunction with FIG. 3. As a prerequisite activity, the user installs the CaptureHelperUI application on Management/Point-Of-Sale Tablet 1400 (action 401).

Once installed and executing, the CaptureHelperUI application's pairing assist functionality begins (or resumes after a predetermined special event, discussed below) at action 402. While FIG. 4 shows flow proceeding from action 402 to action 410, it will be understood that flow could instead equivalently proceed from action 402 to action 412.

If at action 410 favorites are to be added (e.g., as directed by a user), then flow proceeds to action 404 to (re)connect with all available but currently disconnected peripheral devices. (Any existing connections are maintained without interruption.) According to embodiment and/or usage scenarios, the CaptureHelperUI application decides whether to implement the add to favorites function based on the state of, or state transition of, a GUI rendered virtual switch on the central's touch screen. E.g., toggling or tapping (clicking) the virtual switch is treated as user input to add new favorites (Yes, exiting action 410 to the left).

In some embodiments and/or usage scenarios, the add favorites mechanism connects all available peripherals regardless of their favorite status/history. In some embodiments and/or usage scenarios, implementing a connection at action 404 corresponding to establishing a new BLE favorite comprises a connection, one-time pairing, and bonding, while implementing a connection at action 404 corresponding to a previously established BLE favorite comprises connection and bonding.

Any first-time connected peripherals are marked as favorites (action 405) and remain as such unless explicitly removed under user input. The connection is used (action 408) until there is a predetermined special event (action 409), such as a disconnection event (for any reason), the CaptureHelperUI application is reset, one or more special interrupts has happened, or one or more polling intervals or other timers has lapsed. The next time that a newly marked favorite peripheral is power cycled, or is otherwise disconnected for any reason, upon again becoming available the peripheral will automatically reconnect with the central (as the central has the peripheral identified as a favorite).

If at action 410, currently no favorites are to be added, then the flow next determines if one or more favorites are available (action 412). If favorites are available, then flow proceeds to action 407 to (re)connect with all available but currently disconnected favorites. (Any existing connections are maintained without interruption.) In some embodiments and/or usage scenarios, implementing the connection corresponding to a favorite (action 407) comprises connection and bonding. Flow then proceeds to action 408 as described previously. If favorites are not available (action 412), then flow proceeds back to await adding new favorites (action 410).

Figure 5:
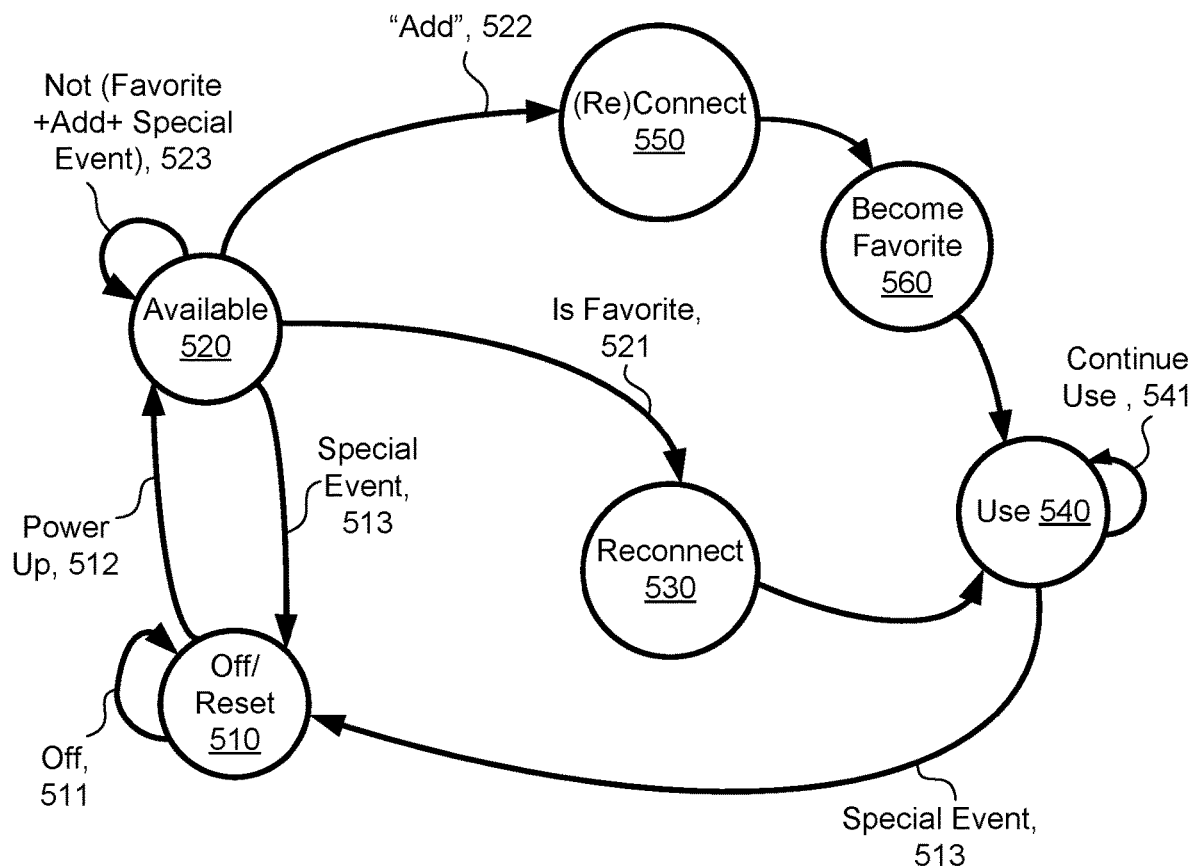
FIG. 5 illustrates, via a state perspective, additional embodiments for application-assisted friendly pairing.

FIG. 5 illustrates, via a state perspective, additional embodiments for application-assisted friendly pairing. The state perspective (with a few exceptions to be detailed below) is that of a peripheral role device interacting with a central role device (AKA, the central) executing an application for friendly pairing. With respect to the discussion of FIG. 5, it will be understood that the term favorite refers to a peripheral that is marked favorite (a peripheral previously identified as a favorite). Aspects not detailed below explicitly with respect to FIG. 5 are as otherwise described in conjunction with FIGS. 3 and 4.

The peripheral device operation begins in Off/Reset state 510. If the peripheral is powered (condition Power Up, 512), the peripheral becomes available to the central (Available state 520) once the peripheral's radio is ready and in range. As detailed further below, depending on various conditions, the peripheral may transition to another state as described below, or otherwise continue in Available state 520 indefinitely (Not (Is Favorite OR Add OR Special Event), condition 523).

If an add favorites operation is performed on the central (condition "Add", 522), the peripheral becomes connected to the central ((Re)Connect state 550), is marked as a favorite on the central (Become Favorite, state 560), and is used by the central (Use, state 540). In some embodiments and/or usage scenarios, the add favorites mechanism connects all available peripherals regardless of their favorite status/history. In some embodiments and/or usage scenarios, implementing (Re)Connect state 550 corresponding to establishing a new BLE favorite comprises a connection, one-time pairing, and bonding, while implementing (Re) Connect state 550 corresponding to a previously established BLE favorite comprises connection and bonding.

If the peripheral has previously been marked as a favorite (condition Is Favorite, 521), the peripheral is reconnected to the central (Reconnect, state 530), and is used by the central (Use, state 540). In some embodiments and/or usage scenarios, implementing the connection (Reconnect state 530) corresponding to a previously established BLE favorite comprises connection and bonding.

The peripheral may continue indefinitely in Use state 540 (Continue Use, condition 541), until a predetermined Special Event, condition 513, such as a disconnection event (for any reason), or the peripheral is reset or powered off. Upon Special Event, condition 513, the peripheral will transition, from either the Use state 540 or the Available state 520, back to the Off/Reset state 510.

Some cross-references to FIG. 4 are as follows. States 550 and 530 correspond respectively to actions 404 and 407. The peripheral itself is unaware of Become Favorite, state 560, which corresponds to an action in the central (e.g. action 405 of FIG. 4). Use state 540 corresponds to action 408.

Conclusion

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within." Language in the claims or elsewhere herein of the form of "at least one of A, . . . , and N" or "one or more of A, . . . , and N" and minor variations thereof should be understood to mean "one or more selected from the group of A, . . . , and N" (where ellipsis indicates an arbitrary plurality of group members). Furthermore, without express indication to the contrary such language is not meant to alter the open-ended scope of a claim or claim element.

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types;

and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent

What is claimed is:

1. A system for providing a consistent peripheral-to-host-connection user experience across classic Bluetooth and BLE Bluetooth peripherals, the system comprising:
   a computing host comprising a memory and a hardware processor configured to perform a predefined set of basic operations in response to receiving a corresponding basic instruction selected from a predefined native instruction set of codes;
   a dual-mode classic/BLE Bluetooth radio subsystem of the computing host, wherein previously connected peripherals operating in accordance with a classic Bluetooth mode are upon an attempt to reconnect automatically reconnected by the radio subsystem without requiring any subsequent action by a user/agent, and wherein previously connected peripherals operating in accordance with a Bluetooth BLE mode require subsequent action by a user/agent to reconnect upon a reconnection attempt; and
   a BLE friendly pairing subsystem of the computing host comprising
      a first set of machine codes selected from the native instruction set for, responsive to user operated control of the computing host, updating storage in the memory identifying select peripherals as favorites,
      a second set of machine codes selected from the native instruction set for monitoring for BLE favorites attempting to reconnect,
      a third set of machine codes selected from the native instruction set for acting as the user/agent to enable prompt reconnection of all the BLE favorites attempting to reconnect;
      a fourth set of machine codes selected from the native instruction set for, additionally responsive to the user operated control of the computing host, connecting to all available peripherals attempting to connect, wherein the subsequently connected peripherals are included among the peripherals identified as favorites; and
      wherein each of the sets of machine codes is stored in the memory.

2. The system for providing a consistent peripheral-to-host-connection user experience across classic Bluetooth and BLE Bluetooth peripherals of claim 1, wherein the BLE friendly pairing subsystem of the computing host further comprises
   a fifth set of machine codes selected from the native instruction set for, subsequent to the connecting to all available peripherals attempting to connect, pairing with all connected peripherals operating in accordance with the classic Bluetooth mode, and pairing and bonding with all connected peripherals operating in accordance with the Bluetooth BLE mode; and
   wherein the fifth set of machine codes is stored in the memory.

3. The system for providing a consistent peripheral-to-host-connection user experience across classic Bluetooth and BLE Bluetooth peripherals of claim 1, wherein the BLE friendly pairing subsystem of the computing host further comprises
   a sixth set of machine codes selected from the native instruction set for implementing the user operated control as a virtualized control on a touch-screen of the computing host; and
   wherein the sixth set of machine codes is stored in the memory.

4. The system for providing a consistent peripheral-to-host-connection user experience across classic Bluetooth and BLE Bluetooth peripherals of claim 3, wherein the virtualized control is a slide switch.

5. The system for providing a consistent peripheral-to-host-connection user experience across classic Bluetooth and BLE Bluetooth peripherals of claim 3, wherein the virtualized control is a button.

6. The system for providing a consistent peripheral-to-host-connection user experience across classic Bluetooth and BLE Bluetooth peripherals of claim 1, wherein the user operated control is a physical switch.

7. The system for providing a consistent peripheral-to-host-connection user experience across classic Bluetooth and BLE Bluetooth peripherals of claim 1, wherein the computing host is a device selected from a phone, a tablet, a laptop computer, and a portable computing device.

8. The system for providing a consistent peripheral-to-host-connection user experience across classic Bluetooth and BLE Bluetooth peripherals of claim 1, wherein at least one of the previously connected peripherals is a device selected from an NFC reader, a particular type of NFC reader/writer, a particular type of RFID reader, a particular type of RFID reader/writer, and a particular type of barcode scanner.

9. The system for providing a consistent peripheral-to-host-connection user experience across classic Bluetooth and BLE Bluetooth peripherals of claim 1, wherein the automatically reconnected peripherals operating in accordance with the classic Bluetooth mode are previously connected and paired peripherals.

10. The system for providing a consistent peripheral-to-host-connection user experience across classic Bluetooth and BLE Bluetooth peripherals of claim 1, wherein the BLE favorites are previously connected, paired, and bonded peripherals operating in accordance with the Bluetooth BLE mode.

11. The system for providing a consistent peripheral-to-host-connection user experience across classic Bluetooth and BLE Bluetooth peripherals of claim 1, wherein the monitoring is intermittent.

12. The system for providing a consistent peripheral-to-host-connection user experience across classic Bluetooth and BLE Bluetooth peripherals of claim 11, wherein the intermittent monitoring is periodic monitoring.

13. The system for providing a consistent peripheral-to-host-connection user experience across classic Bluetooth and BLE Bluetooth peripherals of claim 1, wherein the monitoring is under control of an application installed on the computing host.

14. The system for providing a consistent peripheral-to-host-connection user experience across classic Bluetooth and BLE Bluetooth peripherals of claim 13, wherein the application initiates and ceases the monitoring in accordance with predetermined criteria.

15. A system for providing a consistent peripheral-to-host-connection user experience across classic Bluetooth and BLE Bluetooth peripherals, the system comprising:
  a computing host comprising a memory and a hardware processor configured to perform a predefined set of basic operations in response to receiving a corresponding basic instruction selected from a predefined native instruction set of codes;
  a dual-mode classic/BLE Bluetooth radio subsystem of the computing host, wherein previously connected peripherals operating in accordance with a classic Bluetooth mode are upon an attempt to reconnect automatically reconnected by the radio subsystem without requiring any subsequent action by a user/agent, and wherein previously connected peripherals operating in accordance with a Bluetooth BLE mode require subsequent action by a user/agent to reconnect upon a reconnection attempt; and
  a BLE friendly pairing subsystem of the computing host comprising
    a first set of machine codes selected from the native instruction set for, responsive to user operated control of the computing host, updating storage in the memory identifying select peripherals as favorites,
    a second set of machine codes selected from the native instruction set for monitoring for BLE favorites attempting to reconnect,
    a third set of machine codes selected from the native instruction set for acting as the user/agent to enable prompt reconnection of all the BLE favorites attempting to reconnect;
    a fourth set of machine codes selected from the native instruction set for implementing the user operated control as a virtualized control on a touch-screen of the computing host; and
    wherein each of the sets of machine codes is stored in the memory.

16. The system for providing a consistent peripheral-to-host-connection user experience across classic Bluetooth and BLE Bluetooth peripherals of claim 15, wherein the virtualized control is a slide switch.

17. The system for providing a consistent peripheral-to-host-connection user experience across classic Bluetooth and BLE Bluetooth peripherals of claim 15, wherein the virtualized control is a button.

18. The system for providing a consistent peripheral-to-host-connection user experience across classic Bluetooth and BLE Bluetooth peripherals of claim 15, wherein the user operated control is a physical switch.

19. The system for providing a consistent peripheral-to-host-connection user experience across classic Bluetooth and BLE Bluetooth peripherals of claim 15, wherein the computing host is a device selected from a phone, a tablet, a laptop computer, and a portable computing device.

20. The system for providing a consistent peripheral-to-host-connection user experience across classic Bluetooth and BLE Bluetooth peripherals of claim 15, wherein at least one of the previously connected peripherals is a device selected from an NFC reader, a particular type of NFC reader/writer, a particular type of RFID reader, a particular type of RFID reader/writer, and a particular type of barcode scanner.

21. The system for providing a consistent peripheral-to-host-connection user experience across classic Bluetooth and BLE Bluetooth peripherals of claim 15, wherein the automatically reconnected peripherals operating in accordance with the classic Bluetooth mode are previously connected and paired peripherals.

22. The system for providing a consistent peripheral-to-host-connection user experience across classic Bluetooth and BLE Bluetooth peripherals of claim 15, wherein the BLE favorites are previously connected, paired, and bonded peripherals operating in accordance with the Bluetooth BLE mode.

23. The system for providing a consistent peripheral-to-host-connection user experience across classic Bluetooth and BLE Bluetooth peripherals of claim 15, wherein the monitoring is one or more of intermittent and periodic.

24. The system for providing a consistent peripheral-to-host-connection user experience across classic Bluetooth and BLE Bluetooth peripherals of claim 15, wherein an application installed on the computing host initiates and ceases the monitoring in accordance with predetermined criteria.

* * * * *